Sept. 16, 1969     C. E. JUSTIS, SR     3,467,133
DOUBLE TAPERED FAUCET WASHER
Original Filed June 1, 1965
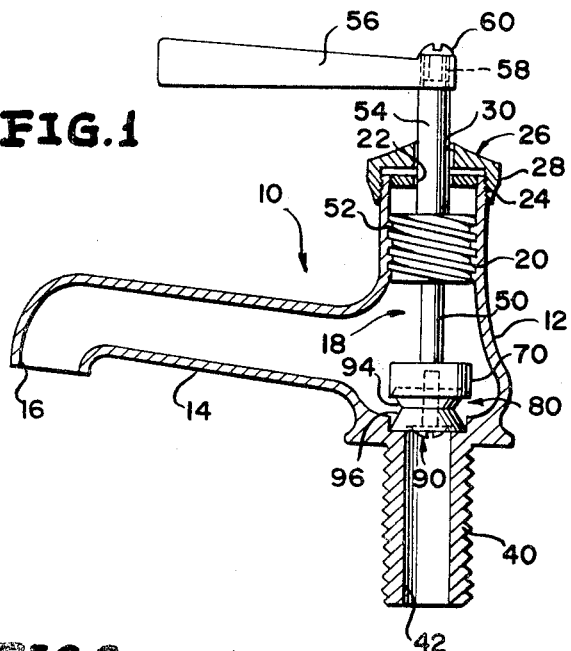
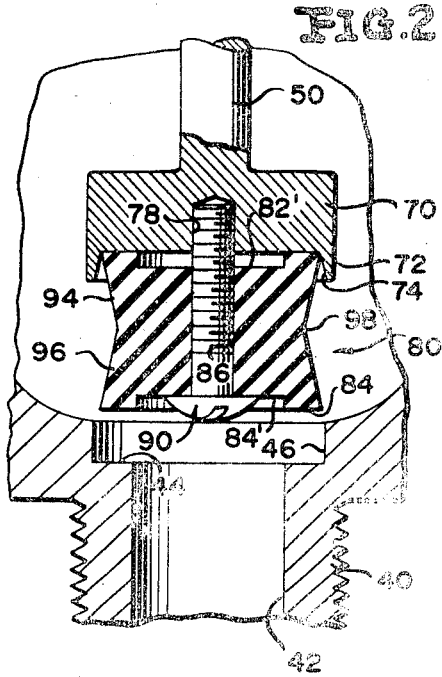
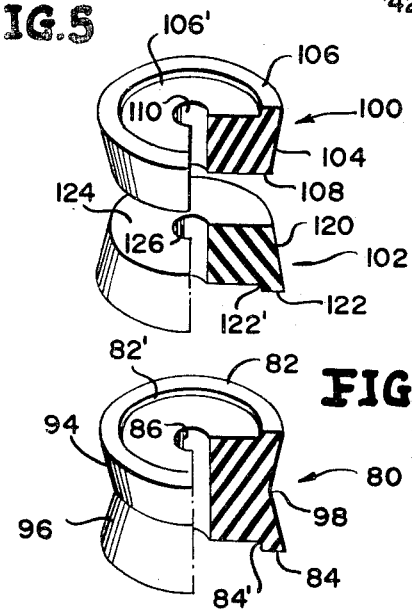
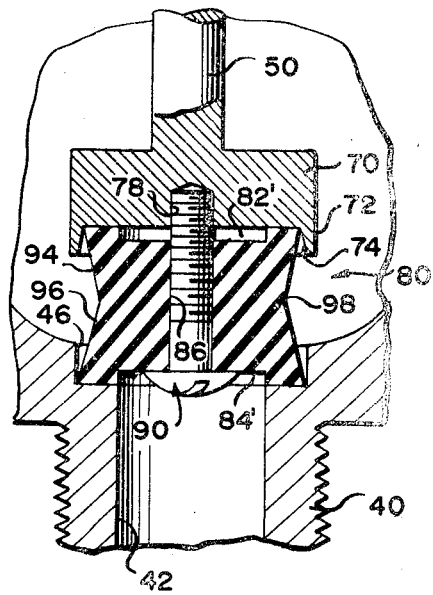
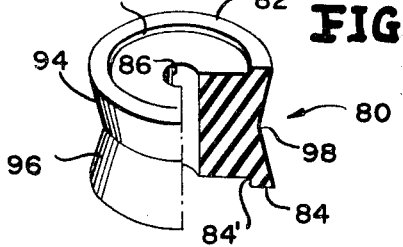
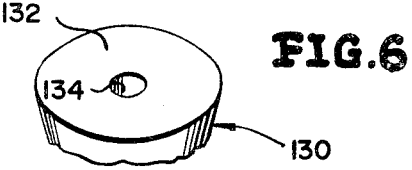
INVENTOR
CHARLES E. JUSTIS, Sr
BY *Shoemaker and Mattare*
ATTORNEYS

3,467,133
DOUBLE TAPERED FAUCET WASHER
Charles E. Justis, Sr., 825 Greenwood Ave.,
Jenkintown, Pa. 19046
Continuation of application Ser. No. 460,246, June 1, 1965. This application Jan. 23, 1968, Ser. No. 699,975
Int. Cl. F16k *43/00, 51/00*
U.S. Cl. 137—329.04                     1 Claim

ABSTRACT OF THE DISCLOSURE

The invention relates to a resilient reversible faucet washer made up of two like portions whose combined thickness is approximately double that of an ordinary washer. The portions are frusto-conical with their small ends in abutting relation and their opposite ends presenting like flat annular sealing surfaces. An axial opening extends through the portions for receiving the fastening elements.

---

This application is a continuation of my application Ser. No. 460,246, filed June 1, 1965, now abandoned.

The present invention relates to a new and novel faucet washer construction, and more particularly to relatively resilient faucet washers adapted to engage a seat in a conventional faucet assembly to provide a seal therewith and to prevent the flow of liquid therepast when so seated.

In conventional faucet assemblies, washers are generally removably mounted therewith so that they may be replaced from time to time when they become worn. It is accordingly usually necessary to provide a new washer when the old one is worn. A particular feature of the present invention is to provide an arrangement whereby the washer is reversible so that when it becomes worn on one side thereof, the washer can simply be reversed in the faucet assembly whereupon it can be reused thereby providing in a single faucet washer an arrangement which will have a useful life substantially twice that of a conventional washer.

The washer of the present invention incorporates a novel construction wherein the body means thereof is provided with sealing surfaces at opposite ends thereof, and the body means is of reduced cross sectional dimension at an intermediate point of the body means. The outer side surface of the body means is reversely tapered to define two frusto-conical surfaces which intersect with one another at the medial portion of the body means so that the minimum cross section of the body means is disposed midway between the opposite sealing surfaces formed thereon. With this particular tapered configuration, the peripheral edge portion of each sealing surface is of greater flexibility than the ordinary washer construction so as to ensure effective seating with the adjacent seat portion formed in the metallic part of the washer assembly.

In addition, this reversely tapered outer surface provides an arrangement whereby the outer side wall of the washer does not have a tendency to bind against the walls of the assembly adjacent the seat portion thereby facilitating opening of the faucet after it has been closed and seated.

Additionally, by providing the arrangement whereby the minimum cross sectional dimension of the washer is provided at the medial portion thereof, a cushioning effect is obtained when pressure is applied to the washer when closing the faucet, and this reversely tapered configuration also enables ready expansion and contraction of the washer.

An object of the present invention is to provide a new and novel faucet washer which is reversible and which can be mounted in two different positions in a faucet assembly so as to substantially double the life expectancy of the washer.

Another object of the invention is the provision of a faucet washer having a more flexible peripheral edge portion of the sealing surface to ensure a good seal with a cooperating seat portion.

Still another object of the invention is to provide a faucet washer having a unique configuration which minimizes the possibility of the washer binding with adjacent wall portions of the faucet assembly.

A still further object of the invention is the provision of a faucet washer having a particular configuration which provides a cushion effect and which facilitates expansion and contraction thereof.

Yet another object of the invention is to provide a faucet washer which is simple and inexpensive in construction, and yet which is quite efficient and reliable in use.

Other objects and many attendant advantages of the invention will become more apparent when considered in connection with the specification and accompanying drawings, wherein:

FIG. 1 is a longitudinal section through a faucet assembly incorporating the faucet washer of the present invention;

FIG. 2 is an enlarged cross sectional view of a portion of the structure shown in FIG. 1;

FIG. 3 is a view similar to FIG. 2 illustrating the components in a different relative position;

FIG. 4 is a top perspective view, partly broken away, illustrating the faucet washer shown in FIGS. 1–3;

FIG. 5 is a top perspective exploded view, partly cut away, illustrating a modified form of faucet washer according to the present invention; and FIG. 6 is a top perspective view partly broken away of still another form of faucet washer according to the present invention.

The body means of the washer is provided with a particular configuration as mentioned previously and as described in detail hereinafter, and it should be understood that this body means may either be of a one-piece construction, or may be formed of a plurality of portions as hereinafter set forth.

Referring now to the drawings wherein like reference characters designate corresponding parts throughout the several views, a first modification of the invention is illustrated in FIGS. 1–4 inclusive, and the faucet assembly includes a hollow casing 10 including a main portion 12, a neck portion 14 extending laterally from the main portion 12 and terminating in a downwardly projecting spout portion 16. A valve assembly indicated generally by reference numeral 18 is disposed within the casing for opening and closing the faucet as desired.

Internal threads 20 are formed in an upwardly extending part of the main portion 12 of the casing, and a central hole 22 is provided through the top portion of the casing. External threads 24 are provided around the upper portion of the casing, and a cover plate 26 is provided with a peripheral downwardly extending flange portion 28 which is internally threaded so as to be threaded on the threads 24 on the casing to secure the cover plate in position. The cover plate is provided with a central hole 30 aligned with hole 22 for a purpose hereinafter described.

At the lower portion of the casing, a tubular extension 40 is provided having threads on the outer surface thereof and having a longitudinally extending bore 42 formed therethrough. As seen most clearly in FIG. 2, the upper end of bore 42 opens in the central part of an annular seat 44 which is substantially flat and adapted to cooperate with the novel washer of the invention. The casing includes a generally cylindrical wall portion 46 adjacent the seat 44.

The valve assembly includes a valve stem 50 having an enlarged externally threaded portion 52 formed thereon, this enlarged threaded portion being threaded within the internal threads provided in the casing whereby relative rotation between the valve stem and the casing will cause movement of the valve mechanism toward and away from the seat of the casing in a conventional manner.

A valve stem portion 54 extends upwardly from the enlarged portion 52, portion 54 extending through holes 22 and 30 previously described and having a handle 56 secured to the upper end thereof through the intermediary of a spline connection 58 and a bolt 60 so that the handle is fixed to the valve stem.

The lower end of valve stem portion 50 terminates in an integral enlarged portion 70 having a peripheral downwardly extending flange portion 72 which includes a tapered inner surface 74 for receiving the faucet washer of the present invention. A threaded hole 78 is provided in the enlarged portion 70 for receiving the attaching means for holding the faucet washer in place as hereinafter described.

The faucet washer of the present invention is indicated generally by reference numeral 80 in the drawings, and the body means of the washer may comprise any suitable resilient material, and preferably the material may be a fluorocarbon such as Teflon, or polytetrafluoroethylene, such material having desirable properties for use as a washer since it has the desired degree of inherent resilence and is not adversely affected by the usual liquids passing through a faucet.

The body means 80 as seen most clearly in FIG. 4 includes opposite end surfaces 82 and 84 which are sealing surfaces adapted to cooperate with the seat 44 of the casing of the faucet assembly. These opposite sealing surfaces of the body means are substantially flat and extend substantially parallel with one another. These two sealing surfaces include central recessed portions 82' and 84' respectively, and a central bore 86 is formed completely through the body means and opens in the center part of the recessed portions 82' and 84'.

Attaching means is provided in the form of a bolt 90 which fits snugly within the bore 86 provided in the body means and which is threaded into the threaded hole 78 provided at the lower portion of the valve stem. This bolt 90 has an enlarged head portion which is adapted to fit within one of the recessed portions at one side of the body means as seen in the drawings. As illustrated, the washer is mounted in such position that the sealing surface 84 is adapted to engage the seat in the casing, and the head of the bolt is disposed within the central recessed portion 84'.

The body means includes an outer side surface of a unique construction which defines a pair of substantially frusto-conical surfaces 94 and 96 which taper from the sealing surfaces 82 and 84 respectively inwardly toward the medial portion of the body means so as to define a reversely tapered outer side surface which has a reduced cross sectional dimension intermediate the opposite sealing surfaces and wherein the frusto-conical outer surface portions 94 and 96 intersect one another substantially midway between the opposite sealing surfaces 82 and 84.

It will also be noted that the body means is formed substantially symmetrically about the central bore 86 extending therethrough, and that the cross sectional areas lying in planes extending perpendicular to the axis of the longitudinal bore 86 are all circular in configuration.

It is apparent that the minimum cross sectional dimension of the body means will occur at the medial portion 98 thereof which is disposed halfway between the opposite sealing surfaces of the body means.

In the first described modification, a one-piece washer construction is illustrated. Referring now to FIG. 5, a two-piece washer construction is illustrated wherein the two portions of the washer are indicated generally by reference numerals 100 and 102. These two portions may be formed of the same material as the previously described modification.

Portion 100 as seen in FIG. 5 includes a substantially frusto-conical outer surface portion 104 which extends between opposite end surfaces 106 and 108. End surface 106 may be termed a large end surface and end surface 108 may be termed a small end surface since the portion 100 tapers inwardly from surface 106 to surface 108. The large end surface 106 also forms a sealing surface adapted to cooperate with a seat in the casing. A central recessed portion 106' is provided in the sealing surface 106.

A central longitudinally extending bore 110 extends completely through portion 100 and opens at one side in the small end surface 108 and at the opposite side in the central part of the recessed portion 106'. The body portion 102 is of substantially the same construction as body portion 100 and includes an outer side surface 120 which is generally frusto-conical in configuration and which extends between a large end surface 122 and a small end surface 124. A central recessed portion 122' is provided in the large end surface 122 which also comprises a sealing surface, it being apparent that the effective sealing surface is actually annular in configuration.

A central bore 126 extends longitudinally through body portion 102, opening at one side in the center of the small end surface 124, and opening at the opposite side in the central part of the recessed portion 122'.

When utilizing the arrangement as shown in FIG. 5, surfaces 108 and 124 are disposed in abutting relationship with one another and the bores 110 and 126 are aligned with one another. In this relationship, the over-all body means is of the same general construction as that described in connection with FIGS. 1 through 4 inclusive, and operates in the same manner when in assembled relationship in a valve assembly with a suitable bolt or other attaching means extending through the aligned bores.

Referring now to FIG. 6, a further modified form of the invention is illustrated wherein the washer construction may be either of a one-piece arrangement as shown in connection with FIGS. 1 through 4 inclusive, or a two-piece arrangement as shown in FIG. 5.

The washer 130 as seen in FIG. 6 includes an end surface 132 or sealing surface which is perfectly flat and which is not provided with a recessed central portion as in the previously described modifications. A central bore 134 extends through the washer and opens in the central part of the sealing surface. It is apparent that a washer as shown in FIG. 6 is identical in all respects with the previously described modifications with the exception that the central recessed portion provided in the sealing end surface is eliminated.

It will be noted that the body means is so dimensioned that the diameter thereof at either end surface is approximately 150% of the dimension of the body means extending parallel with the axis of the bore therethrough. In addition, the diameter of the medial portion of the body means taken through that part of the body means of minimum cross sectional dimension is intermediate the diameter of the end surfaces of the body means and the dimension of the body means extending parallel with the axis of the bore therethrough. These relative dimensions are considered to provide optimum results for carrying out the purposes of the present invention.

It is apparent from the foregoing that there is provided according to the present invention a new and novel faucet washer construction wherein opposite end portions of the washer define sealing end surfaces adapted to cooperate with a seat in the casing of the faucet assembly. When one of these sealing end surfaces of the washer becomes unduly worn, the attaching means may be removed and the washer simply reversed in position so that the opposite sealing end surface is disposed to engage the seat of the casing. It will be noted that the tapered outer configuration of the body means provides a relatively flexible peripheral edge portion of the sealing surfaces at the opposite ends of the washer to ensure an effective seating with the seat formed in the casing. Additionally, this tapered configuration as seen particularly in FIG. 4 will tend to prevent any binding between the outer side surface of the washer and the casing wall portion adjacent to the seat. This will enable ready release of the valve assembly when opening the faucet. The reversely tapered outer surface of the washer will also provide a cushioning effect when pressure is applied thereto, and additionally will permit ready expansion and contraction of the washer to take place. The washer construction is also quite simple and inexpensive in construction, yet effective and reliable in use.

As this invention may be embodied in several forms without departing from the spiirt or essential characteristics thereof, the present embodiment is therefore illustrative and not restrictive, and since the scope of the invention is defined by the appended claim, all changes that fall within the metes and bounds of the claim or that form their functional as well as conjointly cooperative equivalents are therefore intended to be embraced by the claim.

I claim:

1. In combination a valve head having a circular recess presenting a flat valve seat with outwardly flaring lateral walls and a threaded hole centrally of the bottom thereof, a reversible faucet washer having one end thereof positioned in said recess, said washer comprising an integral body means of resilient material having like flat annular sealing surfaces at opposite ends thereof for optionally contacting said flat valve seat, said body means on its outer side surface between said opposite end surfaces, presenting a pair of like frusto-conical surfaces, each of which tapers from one of said sealing surfaces inwardly toward the medial portion of the body means, said frusto-conical surfaces intersecting one another on a circular line disposed substantially midway between said sealing surfaces, each of said opposite ends having a circular depression spaced inwardly of the peripheral edge, the outer edge of the depression defining with said peripheral edge said annular flat sealing surface, an axial opening extending from the bottom of one depression to the bottom of the other and in alignment with said threaded hole, and a screw passing through said axial opening and engaging the threaded hole for securing said washer in said recess, with said peripheral edge only contacting the lateral walls of said recess.

References Cited

UNITED STATES PATENTS 1,667,580   4/1928   Albrecht.

FOREIGN PATENTS 7,229   1/1913   Great Britain.

WILLIAM F. O'DEA, Primary Examiner

D. R. MATTHEWS, Assistant Examiner

U.S. Cl. X.R.

202—187; 251—215, 357